(12) United States Patent
Bush et al.

(10) Patent No.: US 9,800,474 B1
(45) Date of Patent: Oct. 24, 2017

(54) INTER SERVICE NETWORK COMMUNICATION OPTIMIZATION

(71) Applicant: Amazon Technologies, Inc., Seattle, WA (US)

(72) Inventors: Anthony Clay Bush, Seattle, WA (US); Darryl Chalmers, McKinney, TX (US); Furqan Ali Khan, Bellevue, WA (US); Tipu Saleem Qureshi, Seattle, WA (US); Troy James Ulmer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 14/520,246

(22) Filed: Oct. 21, 2014

(51) Int. Cl.
*G06F 21/00* (2013.01)
*H04L 12/24* (2006.01)
*H04L 12/26* (2006.01)
*H04L 29/06* (2006.01)

(52) U.S. Cl.
CPC .......... *H04L 41/32* (2013.01); *H04L 43/0805* (2013.01); *H04L 63/20* (2013.01)

(58) Field of Classification Search
CPC ...... H04L 41/32; H04L 63/20; H04L 43/0805
See application file for complete search history.

(56) References Cited

U.S. PATENT DOCUMENTS

| | | | | |
|---|---|---|---|---|
| 8,560,699 | B1 * | 10/2013 | Theimer | G06F 9/44505 705/26.1 |
| 2009/0282161 | A1 * | 11/2009 | Mathur | H04L 12/5695 709/232 |
| 2011/0238855 | A1 * | 9/2011 | Korsunsky | G06F 21/55 709/231 |

* cited by examiner

*Primary Examiner* — Kendall Dolly
(74) *Attorney, Agent, or Firm* — Thorpe North & Western, LLP.

(57) ABSTRACT

Technology for provision and use of inter service network communication optimization is provided. A method may include determining an available network bandwidth between a private service network and a public service network and determining processing availability at the private service network and at the public service network. Rules may be identified for transferring data between the private service network and the public service network. A determination of whether to transfer data between the private service network and public service network may be made based on the available network bandwidth, the processor availability and the bandwidth rules.

20 Claims, 9 Drawing Sheets

INTER SERVICE NETWORK COMMUNICATION OPTIMIZATION

BACKGROUND

A model for delivering hosted services over a network such as the Internet that has gained fraction in recent years is commonly referred to as virtualization. Virtualization is the delivery of computing as a service rather than a product, whereby shared resources, software, and/or information are provided to computers and other devices as a utility (like the electricity grid) over a network (typically the Internet). Virtualization may use public service networks, private service networks or hybrid service networks. Hosted services may fall into a variety of categories such as, for example: Infrastructure-as-a-Service (IaaS), Platform-as-a-Service (PaaS) and Software-as-a-Service (SaaS).

Virtualized computing may generally be available on demand, often by the minute or the hour, for example. A user may use as much or as little of a service as desired. Virtualized computing services are often managed by a computing service provider. Virtualized computing typically involves some degree of distributed computing. Use of virtualized computing in the enterprise may reduce expenditures on computing infrastructure such as hardware, application and bandwidth costs, as well as maintenance. Virtualized computing and software as a service (SaaS) infrastructures may present a cost effective solution for meeting computing needs.

In general, there exist public and private service networks. Public service networks are often accessible from any location, with the appropriate credentials, and provide computational resources to any interested customers. In contrast, a private service network is often privately-owned and operated. Private service networks generally serve a limited population of users, such as employees of a large corporation that owns the compute infrastructure, for example. Virtual private service networks can be created from public service network resources.

DETAILED DESCRIPTION

Technology for inter service network communication optimization is provided. In one example, a method may include determining an available network bandwidth between a private service network and a public service network and determining processing availability at the private service network and at the public service network. Rules may be identified for transferring data between the private service network and the public service network. A determination of whether to transfer data between the private service network and public service network may be made based on the available network bandwidth, the processor availability and the rules.

In a more specific example, a technology may include determining whether to compress the data when a decision is made to transfer the data based on the available network bandwidth, the processing availability and the rules. Additionally, the technology may include optimizing security of the packets sent between the private service network and the public service network by inspecting packets to identify whether a header of the packets indicates a security standard for the packets and enforcing the security standard when the security standard is indicated in the header. The technology may also include optimizing a workload for the public service network and the private service network by identifying a priority of jobs to be performed by inspecting the header of the packets to determine whether an indicator of priority is present, and using both the public service network and the private service network to perform the jobs based on the priority indicated in the header. The technology may yet further include performing a network address translation of an IP address in the private service network or the public service network from which the packets are sent to a non-conflicting IP address when there is a conflict with the IP address from which the packets are sent and an IP address in the service network to which the packets are sent.

Figure 1:
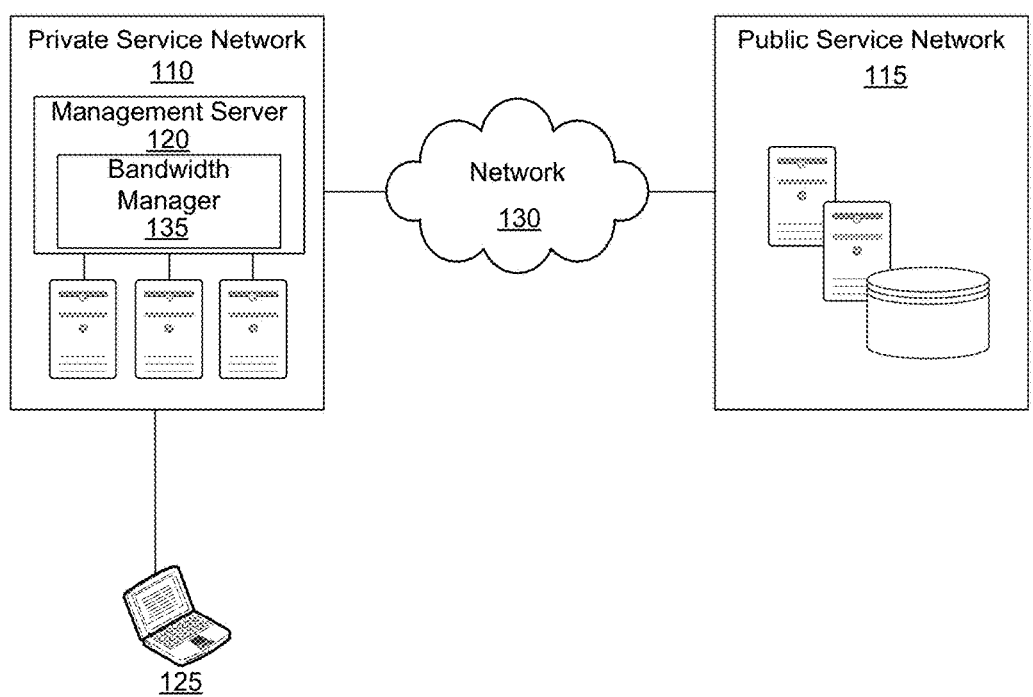
FIG. 1 is a block diagram of an inter service network communication optimization system having a bandwidth manager in accordance with an example of the present technology.
Figure 2:
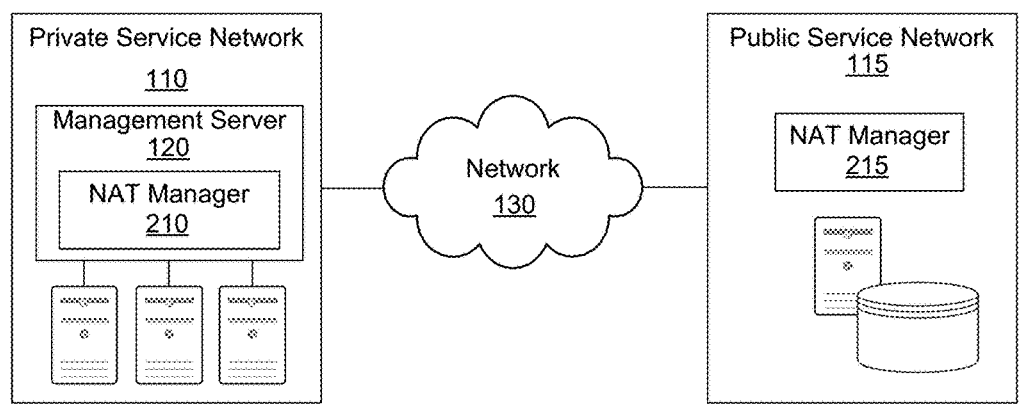
FIG. 2 is a block diagram of an inter service network communication optimization system having a network address translation manager in accordance with an example of the present technology.
Figure 3:
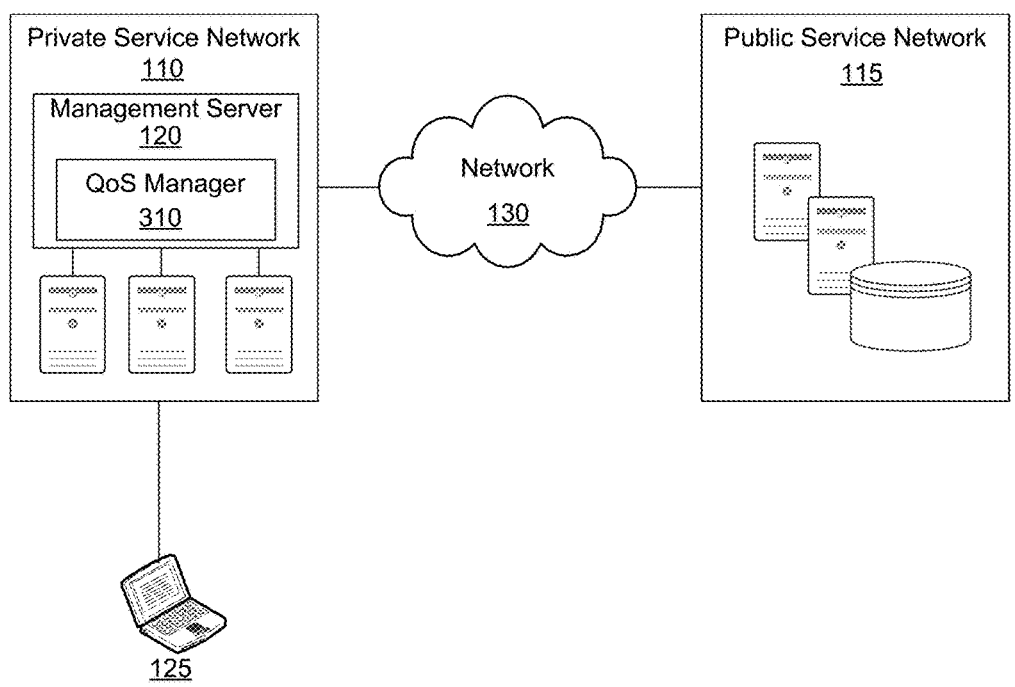
FIG. 3 is a block diagram of an inter service network communication optimization system having a quality of service manager in accordance with an example of the present technology.
Figure 4:
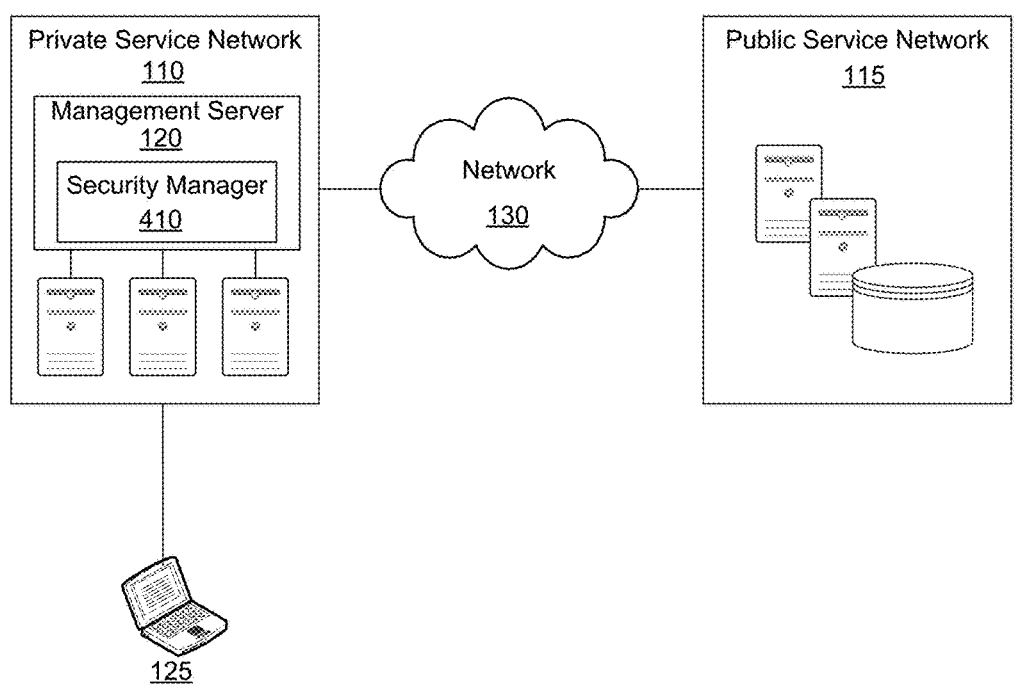
FIG. 4 is a block diagram of an inter service network communication optimization system having a security manager in accordance with an example of the present technology.

FIG. 1 illustrates a block diagram of high level subsystems for managing computing resources in public service networks 115 and private service networks 110. The public and/or private service networks 110, 115 may be computing resource environments. In particular, one or more of the service networks may be service provider environments. For example, the public service network may be a service provider environment that provides software and computer hardware services to customers. Although many entities may use public and/or private service networks 110, 115 and use of both public and private service networks 110, 115 may result in a hybrid service network environment, the efficient use and management of multiple service networks is often challenging. The present technology enables more efficient and effective management of these service networks. In particular, FIG. 1 illustrates one example in which a bandwidth manager 135 is hosted on a management server 120. While the management server 120 is illustrated separately from other of the computing resources in the private service network 110, the management server 120 or a management agent may optionally be located on each of the computing resources (e.g., virtual machines) or on internal or border routers within the private service network 120. The bandwidth manager 135 on the management server 120 may be utilized to manage bandwidth between a private service network 110 and a public service network 115 across a network 130 to ensure quality of performance for the entity managing the service network, as well as customers 125 of the entity. FIGS. 2-4, as well as the other drawings, illustrate further examples that may also be used to ensure and improve quality of performance for multi-service network scenarios.

Before discussing some of the specifics of bandwidth management provided by the bandwidth manager 135 of FIG. 1, a brief discussion of private, public service networks and hybrid service networks will be provided for context. It is noted that the present technology, while generally discussed in terms of a private and public service network, or a hybrid combination of public and private service networks, may utilize any number of private and/or public service networks in any suitable combination, and may also or alternatively involve any of a variety of other types of service networks, such as virtual service networks, community service networks, distributed service networks and so forth.

As used herein, a "private service network" 110 may refer to a service network infrastructure generally operated for a single organization, group, entity, individual or the like. A private service network 110 may be managed internally or may be managed externally by a third-party. A private service network 110 may be hosted either internally or externally to a local or private network. A private service network 110 may be located in a data center. Management of a private service network 110 may involve provisioning of a physical footprint with allocations of physical space, hardware, and environmental controls. Assets or computing resources in the private service network 110 are generally refreshed periodically and this cost is borne by the private service network owner. Further, the private service network resources are dedicated to the owner of the private service network and sometimes the private service network resources may be idle. Private service networks 110 thus have some disadvantages in the level of involvement to setup, maintain and operate a private service network. However, private service networks 110 are often desirable for providing fast response times to customers, security of data and so forth.

Public service networks 115 address some of the shortcomings of private service networks 110 (e.g., setup, management, maintenance, return on investment, etc.) but often lack some of the benefits of private service networks 110 (e.g., latency, security, exclusivity, etc.). A service network may generally be referred to as a "public service network" 115 when services are rendered over a network that is available for public use. Public service network 115 services may be free, by subscription or offered on a pay-per-usage model. Technically, there may be little or no difference between public and private service network architecture. However, security considerations may be substantially different for services (applications, storage, and other resources) that are made available by a service provider for a public audience and when communications are effected over a non-trusted network (e.g., the internet). Generally, public service network service providers own and operate the infrastructure at a data center for the service provider and access is generally via the internet, although direct connect services may be available through private connections to a peering point offered by the service provider.

A hybrid service network, as mentioned previously, may be a composition of two or more service networks (private, public, etc.) that remain distinct entities but are bound together using a hardware-based VPN (virtual private network) connection or another similar linking connection between the networks, offering the benefits of multiple deployment models. The service networks in a hybrid service network may be from different service providers. The capacity or the capability of a service network may be extended, by aggregation, integration or customization with another service network through hybrid service network computing. Varied use cases for hybrid service network composition exist. For example, an organization may store sensitive client data in-house on a private service network application, but interconnect that application to a business intelligence application provided on a public service network as a software service. Another example of a hybrid service network is where public service network computing resources are used to meet temporary capacity needs that cannot be met by the private service network. For example, service network bursting is an application deployment model in which an application runs in a private service network or data center and "bursts" or scales to a public service network when demand for computing capacity increases. In many conventional hybrid service networks, an internal or private service network infrastructure supports average workloads and uses additional service network resources from public or private service networks during spikes in processing demands.

When entities are resource constrained in the private service networks 110 (i.e., private data-centers), these entities may turn to a public service network 115 to shed load. For users that are utilizing private and public service networks 110, 115, however, there are a fair amount of bandwidth and quality concerns that are not addressed by existing technologies. The bandwidth manager 135 of FIG. 1 is one example portion of the present technology for improving performance of hybrid service network computing environments. The bandwidth manager 135 may be hosted on a management server 120 running in the private service network 110 and may be utilized to manage bandwidth issues. The bandwidth issues may relate to a network 130 bandwidth, a processor bandwidth and so forth.

The bandwidth manager 135 may be configured to perform bandwidth optimization. Machines or processes running with relatively high CPU (central processing unit) or other high resource usages can offload this resource usage from the private service network to the public service network in an optimized manner. An example operation for offloading of resource usage in an optimized manner may include determining an optimization of resources to offload via calculations. Specifically, the bandwidth manager 135 may use a method to determine available bandwidth versus CPU demands for a particular process that compresses data to determine whether to compress a data stream to be sent between the private and public service networks. The method may consider the processor usage and network bandwidth for transfer of data between the private and public service network 110, 115 in determining whether to compress the data. For example, compression of the data will involve greater CPU usage, placing a higher computing toll on the private service network resources. However, compression of the data will result in less network bandwidth consumption for the transfer of the data to the public service network. Bandwidth rules may be defined by an administrator indicating under what conditions data should be compressed or transferred without compression. The bandwidth rules may define that data of should or should not be compressed based on attributes, such as: a specified type, a specified source, a specified Quality of Service (QoS), likelihood to consume a specified threshold amount of bandwidth, a large storage footprint or the like. The bandwidth rules may further define a rule priority such that conflicts between different bandwidth rules (or different types of rules described below) may be resolved according to the rule priority.

In one example, software *canaries* may be used to determine a state or bandwidth of a network 130 connection. In other words, the software *canaries* may be used to determine how much bandwidth is available and may implement redundancy routing to accommodate for potential failure. For the purposes of this description, a software canary may be understood to be a computer monitoring module for gathering metrics and comparing the gathered metrics against baseline metrics to monitor behavior. Once a course of action is deemed certified and stable, the course of action (e.g., an amount of compression applied) may be implemented, with the state prior to the action being stored for potential rollback. Specifically as applied to the present discussion, metrics for bandwidth of a network connection may be collected. If network bandwidth is constrained, data may be compressed for more efficient data transfer. If the state of the available bandwidth changes, the decision to compress the data may be re-evaluated and potentially reversed to reduce local processing loads. Further, where multiple network connections are available for use in transferring data, multiple network connections may be used or allocated for use in the transfer to provide redundancy of the data or redundancy in the available network channels to ensure delivery of the data. The canaries may monitor a standard baseline performance for processing or transferring data. When changes to the processing or transfer of data are made, the previous configuration may be stored for a rollback position in the event that performance is negatively affected.

Using a bandwidth manager 135 with bandwidth rules and *canaries* may enable both CPU processing and bandwidth to be optimized in order to implement an efficient communication between private service network 110 and the public service network 115. Public service network 115 monitoring through available monitoring and metrics collection services may be used to implement alarms, alerts, notifications and resolution of issues that may arise through bandwidth management decisions. The public service network 110 or the monitoring service for the public service network 110, may be in communication with the bandwidth manager 135 at the private service network 110 to communicate issues for resolution.

The bandwidth manager 135 may have various resolution options available. For example, the bandwidth manager 135 may determine whether to add new virtual private networks, tunnels, or network connections to increase bandwidth in order to accommodate additional computing resource demands adaptively. The bandwidth manager 135 may determine whether to compress data or send data uncompressed. The bandwidth manager 135 may determine that certain static data should be cached either in the private service network 110 or the public service network 115 (or both) in order to reduce requests for the data from one or the other of the private or public service networks. The static data may be data which is generally not variable or which is constant. Certain processing jobs may rely on the static data. Provision of the static data at both the private service network 110 and the public service network 115 may result in the static data being readily available at either service network such that processing jobs offloaded from the private service network 110 to the public service network 115 may be completed without the delay or bandwidth consumption that may occur if the static data were to be sent to the public service network 115 each time a processing job relying on the static data is offloaded to the public service network 115.

The bandwidth manager 135 may determine to which among multiple available service network options the data or processing is to be offloaded. The bandwidth manager 135 may thus consider bandwidth availability for each of the public or private service networks in communication with the private service network where the bandwidth manager is hosted. In one example, the multiple service networks may be provided through a mesh of data centers. The bandwidth manager 135 may determine, based on the bandwidth rules, how to divide transfer of data among different of the data centers for optimal efficiency. This determination may again be based on the various resource availabilities of the different data centers, any latency likely to be involved with selection of one versus another, prioritization of data, and so forth, as may be defined in the bandwidth rules.

The bandwidth manager 135 may determine in instances where both CPU and network bandwidth are limited to simply send data as quickly as possible, with the understanding that such a decision may not result in as fast a performance as may otherwise generally may be desired. The bandwidth manager 135 may provide a notice to an administrator of limited CPU or network bandwidth. For example, the notice may be a pop-up window, a text message, an email, a pre-recorded voice communication or the like to indicate the limited resource availability. The notice may further ask the administrator whether to requisition additional computing resources. Upon approval from the administrator, the bandwidth manager 135 may implement auto-scaling or other appropriate processes to increase the available computing resources, at least for a short time, which duration of time may optionally be specified by the administrator in the approval. The bandwidth manager 135 may be configured, in some examples, to determine when a network connection bandwidth is constrained, based on monitoring, and may send an alert or notification to the administrator, and may optionally take action without administrator intervention or may await administrator instructions. For example, the bandwidth manager may request additional resources, re-route transfer of data or assignment of processing requests, etc.

The bandwidth manager 135 may be configured to balance available bandwidth against cost constraints for bandwidth, processing or the like. For example, in some scenarios, the available bandwidth may be variable, with a different cost associated with different amounts or tiers of bandwidth availability. The bandwidth rules may, for example, define a balancing ratio for determining whether to increase or decrease the available bandwidth to a different bandwidth tier or priority tier based on current bandwidth utilization and private service network CPU utilization.

The bandwidth manager 135 may be configured to flag potential improvements in performance for review by the administrator. For example, the bandwidth manager 135 may identify options for improving redundancy. Data, processes, and so forth may be recommended to be copied to a redundant host to eliminate or reduce a risk that a customer will see a failure. The bandwidth manager 135 may recommend and/or establish virtual private networks, tunnels, redundancy or any other features designed to improve performance of the hybrid service network.

Other operations in addition to bandwidth management may be performed for optimizing the performance of a hybrid service network computing environment. For example, FIG. 2 illustrates the system with network address translation (NAT) services provided at the private and public service networks. While FIG. 2 illustrates a NAT manager 210, 215, such as a software NAT service or a software or hardware NAT router, at each of the private and public service networks 110, 115, the system may optionally include a single NAT manager 210 or 215 at one or the other of the public or private service networks 110, 115 or may include a NAT manager outside of both of the private and public service networks but configured to intercept packets and perform network address translation.

Network address translation or NAT may refer to a process for modifying network address information in Internet Protocol (IP) packet headers while the packets are in transit across a network traffic routing device for the purpose of remapping one IP address space into another. Particularly in the case of multi-service network environments, conflicts may arise between IP addresses used at the different service networks. A NAT manager 210, 215 may resolve these conflicts by remapping the IP addresses at issue or an entire IP address space. The NAT manager may provide mapping between IPv4 addresses, between IPv6 addresses or mapping of IPv4 addresses to IPv6 addresses (or vice versa).

The NAT manager 210, 215 of the present technology may provide various optimizations specifically for private service network to public service network interactions. For example, the NAT manager 210, 215 may provide automated adaptive NAT services for IP conflicts between private and public service network infrastructure for seamless integration. As mentioned above, public and private service networks 110, 115 may operate using at least some of the same or similar IP addresses or range(s) of IP addresses. The NAT manager 210, 215 may be configured to resolve such conflicts by maintaining a record of addresses for each of the public and private service networks 110, 115 and examining a source IP address of packets destined for one or the other of the service networks. If a source IP address matches an existing address record for an IP address in the target service network, a conflict may be identified and mapping for the IP address may be performed. For example, the NAT manager 210, 215 may map the source IP address to a new, non-existent IP address for the source service network which does not have a conflict with the target service network and may store the new IP address along with the original source address for conversion back to the source address when and if the target service network sends data back to the source using the new address. The NAT manager 210, 215 may implement IPv6/IPv4 NAT services to ensure seamless integration on a network level. The NAT manager 210, 215 may also adaptively implement or correct any routing by communicating with an available SDN (Software Defined Network). As may be appreciated, an SDN architecture decouples network control and forwarding functions, enabling network control to become directly programmable and the underlying infrastructure to be abstracted from applications and network services.

The NAT manager 210, 215 of the present technology may provide automated adaptive NAT services for private-public service network interactions. When connecting two networks, or two service network environments, conflicts in IP addresses commonly arise. Administrators have conventionally performed manual configurations on either service network in order for traffic to be routed properly. However, the present technology avoids such manual intervention to manage IP address conflicts through the use of the NAT service on or provided by the NAT manager(s) 210, 215. The NAT service, as described previously, may "listen to" or examine packets being sent between the service networks and maintain address tables for the respective service networks, and may detect the presence of an IP address conflict. The NAT service may automatically adapt to the conflict by selecting a different, unused address for communication to the target service network and for association with the source address. The NAT service may rewrite the packet data to replace the source address with the new IP address.

The NAT service in the private service network may identify IP addresses in packets in the private service network and the NAT service in the public service network may identify IP addresses in packets in the public service network. The NAT service provides dynamic, on-demand and immediate address translation without manual intervention or configuration and can be extended to a variety of system configurations. For example, the NAT service described is capable of resolving conflicts where multiple sub-nets have conflicts in multiple locations. The NAT service is operable between any number of type of service networks. Service network environments may be configured as a mesh or star or other configuration, and the NAT service is operable to resolve conflicts automatically in any configuration. As a result, this NAT service may enhance internetworking between the service networks.

In examples involving multiple public service networks, the NAT services at each of the public service networks may optionally communicate with one another to ensure that each of the other NAT services translate an address in the same way, or to a same address. When performing address translation within a private service network or where external communications are all managed through the private service network, any public service networks may not need to communicate with one another for network address translation purposes.

In one example, when deciding which range of addresses to use for performing address translation, the NAT service may evaluate which range has more available addresses. Where multiple NAT services are available to perform address translation and selection of one NAT service over another is to be made, the selection may be made automatically such as based on which service network has greater availability of computing resources for performing the address translation.

In one example, the NAT service may use Classless Inter-Domain Routing (CIDR) to define CIDR blocks of addresses for the service networks. The NAT service(s) may intercept and inspect packets to identify the source IP address. The NAT service may select IP address ranges (i.e., the CIDR blocks) for each service network. The selection of the IP address ranges may have an effect on power consumption, as greater or lesser resources may be demanded to perform the address translation. Because the NAT service is automated, the NAT service may smartly select the IP address ranges and how the translation is going to be performed, which selection may be based in part on what computing resources are available in which service network, and which other (if any) NAT services are available to contribute to the address translations. Selection of how to perform the address translation, selection of the IP address assignment, and so forth may further be based on latency and cost (either computing or financial) involved in the selection.

When multiple NAT managers 210, 215 are used, such as at the private service network and at the public service network, as illustrated, the NAT managers 210, 215 may be configured to communicate over the network in order to synchronize the address tables used for network address translation. This may reduce any potential for errors if the NAT managers 210, 215 were otherwise left to independently maintain and manage the address tables. Also the provisioning of multiple NAT managers 210, 215 in multiple locations may provide increased redundancy to enable recovery from a failure at one or the other of the routers.

Referring now to FIG. 3, the present technology may further provide for workload optimization through specification of a Quality of Service (QoS) for packets transferred between service networks. By implementing a QoS header in packets for inter-service network communication, the QoS manager 310 may determine what workloads may be offloaded to the public service network. For example VIP customers may have workloads processed in the private service network with low latency. However, non-VIP customers may have workloads processed in the public service network with a higher latency. QoS may be set for processing tasks, generating logs, delivering video or audio and so forth. The application may set QoS on layer 2 for more rapid QoS decisions.

Different customers may request different jobs with different priorities. In particular, customers may be premium or regular customers, with premium customers paying for prioritized processing of the jobs. Premium customers typically desire, and expect, premium jobs to be processed and returned more rapidly than regular customer jobs. Non-premium or regular jobs may have greater latency. Regular customers may be notified that an upgrade to premium may increase the priority of the job processing and are often content with the tradeoff of greater latency or less strict security standards for regular processing if they choose to not pay for the premium processing. Non priority jobs can often be sent to the service network and processed less expensively.

In some instances, a customer may have a very large job to be processed for the private service network. However, due to the size and complexity of the job request, completing the job solely on the private service network may be less than optimal. The QoS manager 310 may consider options for sending the job to a public service network, performing the job locally at the private service network, or splitting the application across multiple service networks, public and/or private.

Some of the considerations that may be considered by the QoS manager 310 for transferring data and requesting a job may include the availability of using multiple network paths, performing multipart uploads, using multiple direct connect tunnels, and so forth. The QoS manager 310 may determine a compute cost of the workload, a financial cost of offloading the workload, how much memory and/or bandwidth will be used to process the workload, whether the data being transferred should be compressed and so forth. The QoS manager 310 may consider the type of job as well to determine whether or how to offload the job. For example, customers may have different expectations for delivery of video versus delivery of audio, versus delivery of documents versus log reporting and so forth. Customers may generally tolerate less latency for video or audio delivery as compared with document delivery or log reporting. These expectations may be balanced by the QoS manager 310 against whether the customer making the request is a premium versus regular customer. In particular, the QoS manager 310 may consider the CPU, memory, bandwidth and cost demands for performing a job locally in the private service network and/or at the public service network.

QoS rules may be defined by an administrator and used by the QoS manager 310 to balance the various considerations. Each of the QoS considerations described may be weighted or given a priority, as defined by the QoS rules, such that when multiple aspects of performing a request are considered together, the QoS manager 310 may reach a decision for how to perform the request.

The application may be configured to identify an appropriate QoS based on credentials provided by the customer, IP address of the customer or any of a variety of other factors. The application may tag or insert header data into data packets identifying the appropriate QoS for any particular packets. The QoS manager 310 may inspect packets to determine how or where to process the packets, from which service network to request performance of the request in the packets, and so forth.

Referring to FIG. 4, the present technology may further provide for security optimization through specification of a security standard for packets transferred between service networks. The management server 120 in the private service network 110 may include a security manager 410 for performing the security optimization. The security manager 410 may operate in manner similar to what has been described for the QoS manager 310 (FIG. 3) previously.

Specifically, an application may be configured to identify an appropriate security level or security standard for any particular job based on the nature of the job (e.g., the type of job), the identity of the customer, source of the request, whether the customer is a premium or regular customer or any of a variety of other factors. The application may tag or insert header data into data packets identifying the appropriate security standard for the packets associated with the job. The security manager 410 may inspect packets to determine how or where to process the packets, from which service network to request performance of the request in the packets, and so forth in order to maintain the appropriate security for the packets.

The security manager 410 may be configured to detect, through the packet inspection described above, whether there is any sensitive data in the workload and whether the data can or should be offloaded to the public service network 115. The security manager 410 may further adaptively determine whether to encrypt the data when the data is to be offloaded to the public service network 115. The security manager 410 may determine how to encrypt the data based on the type of data or the request, the type of connection between the private and public service networks 110, 115, the level of security available at the public service network 115, and so forth. For example, the security manager 410 may determine that for a particular job, the data is to be encrypted at Layer 2 (data-link layer) (i.e., macsec) to avoid eaves droppers. The security manager 410 may further determine whether to leverage a virtual private network (VPN) or dedicated network connection to increase security.

Customer or administrators may set security compliance standards. For example, the customer may specify for different servers what security is desired. The customer may specify specific processes or types of jobs and the desired security for these processes or jobs. Based on this specification, the application may tag the packets. For example, for credit card transactions, the application may tag packets as PCI (payment card industry) packets. The security standard enforced for these packets may then be implemented to comply with PCI security standards. Depending on the type of the request, the type of data involved, or the like, the security manager 410 may determine whether or not a packet may leave the private service network or to which of the other private or public service networks 110, 115 the packet may be transferred. The security standard may be defined by the customer in an initial configuration of the private service network 110, for example.

In one example, the security manager 410 may assign a security standard to a packet that does not specify a security standard based on the QoS for the packet indicated in the packet header. For example, security rules may be used to define that when a security standard is not specified but QoS is specified, then for the specified QoS a predefined security standard should be enforced. The packet header may optionally be modified to specify this security standard. The security rules may define a minimum security standard for a specified QoS regardless of whether the packet header identifies the security standard. Thus, while a packet may identify a lower security standard for the packet, the rules may dictate that a higher security standard should be enforced due to the specified QoS of the packet. In a reverse example, where a security standard is specified but a QoS standard is not specified, then the security rules (or the QoS) rules may define a QoS standard for the packets based on the security standard. Also, a specified security standard may override a specified QoS standard to specify a different QoS standard when defined by the rules. The security rules may be applied to considerations other than QoS for enforcement of security standards as well. For example, if the application uses a specific host name if the packets originate from one application versus another application or if the packets originate from a particular port, server, or box, then the security rules may define a security standard to apply for each of these considerations.

Security rules may be defined by an administrator or customer 125 and used by the security manager 410 to balance the various considerations. Each of the security considerations described may be weighted or given a priority, as defined by the security rules, such that when multiple aspects of performing a request are considered together, the security manager 410 may reach a decision for how to perform the request. The security manager 410 may ensure that relevant computing resources are compliant with identified security standards, such as being PCI compliant, HIPAA (Health Insurance Portability and Accountability Act) compliant and so forth.

The security manager 410, or the application, may add a TCP/IP (Transmission Control Protocol/Internet Protocol) header to the packets to specify the security standard or a security priority. The header may be added to packets destined to the public service network 115 from the private service network 110 or from the public service network 115 to the private service network 110. Because such a security header is not generally used for network packets outside of the present technology, the security manager 410 may strip these headers from the packets when the packets are delivered to a location other than the private or public service networks 110, 115. Such delivery to other locations may be restricted based on certain security standards, as has been described previously.

For managing bandwidth, address translation, workload, security or other aspects as have been described an illustrated with respect to FIGS. 1-4, the present technology may implement packet sniffing and recognition at a deep packet inspection level to provide a comprehensive and cohesive private-public service network experience with improved performance over conventional technologies. Various rules may be utilized by the various managers to perform the optimizations described. Although the various managers and rules have been described and illustrated separately, these managers may represent functions provided by a single manager, and/or the rules may represent a single set of rules to be used by the one or more managers.

The system may be implemented in a public and/or private service provider environment (e.g., the public and private service networks). The service provider environment may provide network-based services or computing resources. These computing services or resources provide access to a hardware substrate that is underlying the computing resources. Some example networked computing resources include a compute service, a storage service, a networking service and an I/O (Input/Output) service. For example, a computing instance may be executing on a hypervisor, which in turn executes on a hardware substrate that is server hardware.

As used herein "virtual computing" may refer to the use of computing services or resources (hardware and/or software) which may be available at a remote location from users or administrators of the computing resources and the virtual computing resources may be accessible over a network, such as the Internet. Users may be able to buy these computing resources (including storage, computing power, networking and applications) as a utility on demand and sometimes by the hour. Use of virtual computing resources can provide a number of advantages including cost advantages and/or the ability to adapt rapidly to changing computing resource needs.

The service provider environment may be a multi-tenant service provider environment, such as a "cloud" environment for example. The service provider environment may include an execution environment or a computing instance that includes an application software stack for the user's program or application together with one or more infrastructure resources for executing the user's program on the compute service. The virtualization environment or computing instance may include a user-selectable operating system (e.g., Linux, Windows, etc.), application server (e.g., Apache Tomcat), system or application configuration, etc. The virtualization environment can be configured to be accessed at a specific URL (Uniform Resource Locator). The infrastructure services can include, but are not limited to, a load balancer to distribute workload across the requested computing resources, a load scaler to scale computing resources in response to load or demand variations, a firewall or other service to control access to the computing resources, a monitoring interface that permits the user to monitor execution of applications, data storage resources (e.g., scalable volume block storage), and so forth. In some examples, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing resources, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing resources for executing software, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as video delivery. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The systems of FIGS. 1-4 may be implemented across one or more computing devices, which may be connected via a network. For example, the computing resources may host various engines and/or modules and such modules may be executable by a processor. The computing resources may be implemented as a plurality of computing nodes, each of which comprises at least one processor and a memory, where the computing nodes are configured to collectively implement the modules, data stores and so forth.

The computing resources may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 5:
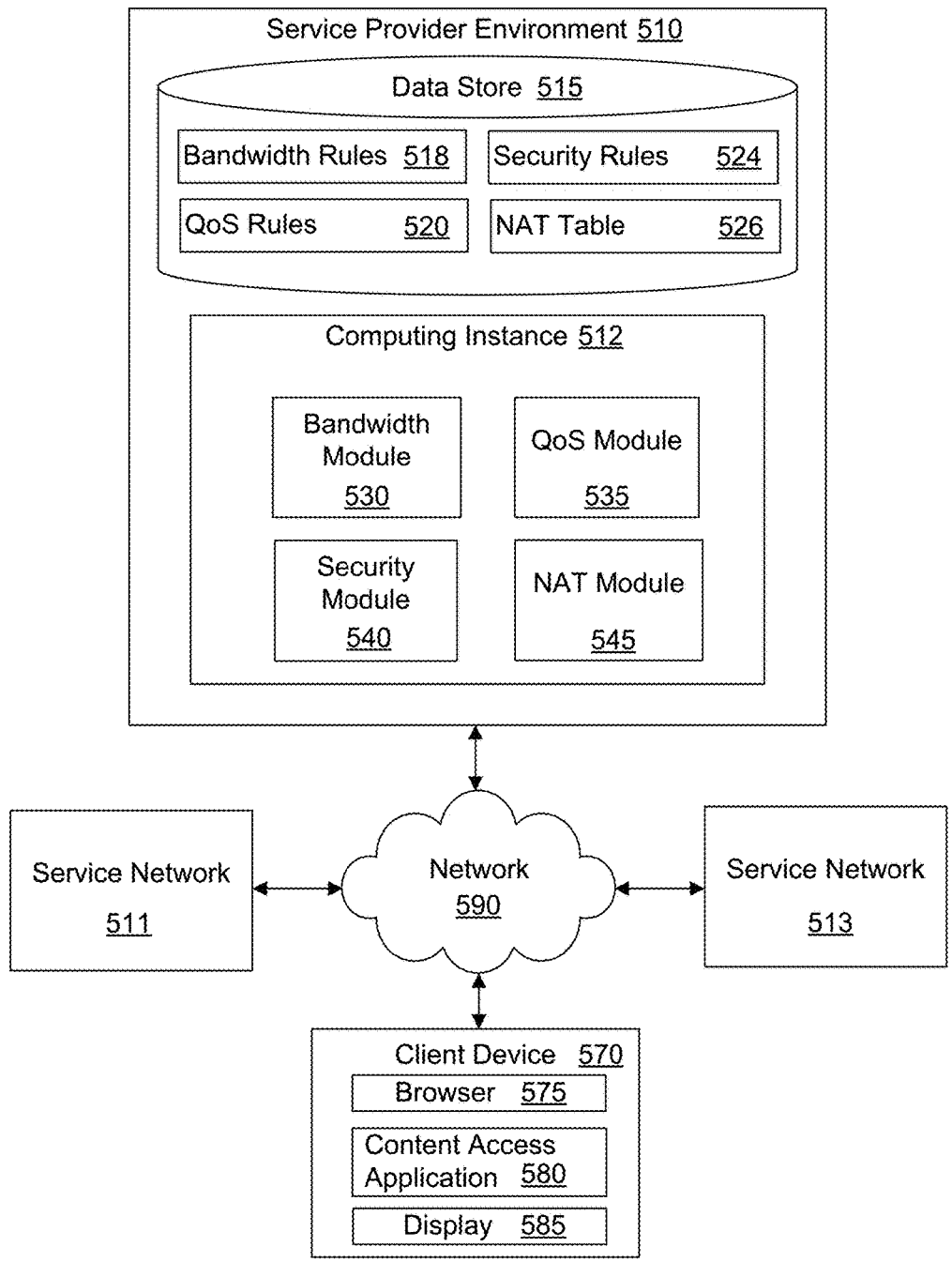
FIG. 5 is a block diagram of an inter service network communication optimization system in accordance with an example of the present technology.

Reference will now be made to FIG. 5. FIG. 5 illustrates a system for optimizing inter service network communications in accordance with an example of the present technology. A private service network or service provider environment 510 may include any number of server computers for a compute service. The server computers may provide computing services for executing software or computing instances, which may also be referred to as virtual machines. A virtual machine may generally be an instance of a software implementation of a machine (i.e. a computer) that executes computer code like a physical machine.

The system may include any number of modules in the service provider environment 510. For example, the system may include a bandwidth module 530. The bandwidth module 530 may be configured for determining an available network bandwidth between a private service network (e.g., service provider environment 510) and a public service network (e.g., service networks 511, 513), a processor availability at the private service network and at the public service network and when to transfer data between the private service network and public service network. These determinations may be made on factors such as the available network bandwidth, the processor availability and bandwidth rules for transferring data between the private service network and the public service network. Based on the available network bandwidth, the processor availability and the bandwidth rules, the bandwidth module 530 may also determine whether to compress the data when or after a determination is made to transfer the data.

The system may further include a QoS module 535. The QoS module 535 may be configured for optimizing a workload for the public service network and the private service network by identifying a priority of jobs to be performed. The header of the packets may include a priority indicator that may be related to QoS which may optionally also be indicated in the packet header. The QoS module 535 may inspect the header of the packets to determine whether the indicator of priority is present. The QoS module 535 may assign and balance a workload using the public service network and/or the private service network to perform the jobs based on the priority indicated in the headers of the packets. The QoS module 535 may be further configured to determine a compute cost of the jobs, the memory and network bandwidth to complete the jobs and whether to compress the data in the packets. The QoS module 535 may be further configured to determine how to split the jobs between the public service network and the private service network based on a type of content contained in the packets as indicated in the header. These various determinations may be made based on priority of the jobs, computing resource availability, QoS rules and the like. For example, QoS rules may be used in connection with security rules, bandwidth rules or the like to determine how to process the data in a way that will satisfy each of the applicable rules.

The system may further include a security module 540. The security module 540 may be configured for optimizing security of the packets sent between the private service network and the public service network. For example, the security module 540 may inspect the packets to identify whether a header of the packets indicates a security standard for the packets. If the security standard is indicated in the header then the security module 540 may enforce the security standard. In some examples, the security module 540 may assign a security standard to the packets, regardless of any existing or non-existing security standard header information based on other factors as have been described previously, such as a QoS for the packets, for example. In one example, the security module 540 may be configured to enforce the security standard by encrypting the packets or preventing the packets from being sent between the service networks.

The system may further include a NAT module 545. The NAT module 545 may be configured for detecting IP address conflicts between IP addresses of the private service network and the public service network. The NAT module 545 may inspect packets sent between the private service network and the public service network to identify an IP address in the private service network or the public service network from which the packets are sent. This packet inspection may be part of the IP address conflict testing process and/or an address translation process. The NAT module 545 may perform a network address translation of the IP address in the private service network or the public service network from which the packets are sent to a non-conflicting IP address when there is a conflict with the IP address from which the packets are sent. The NAT module 545 may be further configured to implement a first network address translation service on the public service network and a second network address translation service on the private service network and to synchronize network address translation tables between the first and second services.

The system may include one or more data stores 515. The data store 515 may include or be configured to store any of a variety of useful types and formats of data. For example, the data store 515 may include a bandwidth rules data store 518, a QoS rules data store 520, a security rules data store 524 and a NAT table 526, respectively for use by the bandwidth module 530, the QoS module 535, the security module 540 and the NAT module 545.

Services provided through the service provider environment may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Computing services offered by a service provider environment, may include a computing device that executes as one or more servers or computing instances. A user may operate one or more servers to execute an operating system and computing applications as a service. A user may create, launch, and terminate servers as desired. The creator of the lab may have some control over the geographical location of servers or clusters of servers to optimize latency and provide high levels of redundancy.

The user may access and manage the one or more servers over a network 590 connection, such as a connection through the Internet, for example. The user may perform various operations on the servers such as adding, updating, modifying, deleting or other otherwise maintaining software on the servers. These operations may be performed by the user from the client device 570.

Server(s) or computing device(s) in the service provider environment 510 may be a computing instance 512 as previously explained, and the computing instance 512 may be implemented using a service provider environment in a service provider environment. The computing instance 512 may represent one of any number of computing instances which may execute in the service provider environment. The service provider environment may include a virtual distributed computing system with a virtualization layer executing on a hardware substrate layer. The hardware layer may include a plurality of physical computers, servers or processing nodes. The virtualization layer (e.g., hypervisor) may provide a platform on which virtual computing instances may be created. In other words, the virtual computing instances may execute on the hardware layer by using the platform provided by the virtualization layer. This computing service architecture that supports computing instances is illustrated in more detail later.

Client devices 570 may access data, content pages, services and so forth, via the service provider environment 510, from a computing instance or server in a computing service provider environment or one or more computing instances or clusters, over a network 590. Example client devices 570 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 585 that may receive and present message content.

The system may be implemented across one or more computing device(s) in the service provider environment 510 and including client devices 570 connected via a network 590. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form.

Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 5 may be representative of a plurality of client devices 570 that may be coupled to the network 590. The client device(s) 570 may communicate with the computing device over any appropriate network, including an intranet, the Internet, a cellular network, a local area network (LAN), a wide area network (WAN), a wireless data network or a similar network or combination of networks.

The client device 570 may include a display 585. The display 585 may comprise, for example, one or more devices such as cathode ray tubes (CRTs), liquid crystal display (LCD) screens, gas plasma based flat panel displays, LCD projectors, or other types of display devices, etc.

The client device 570 may be configured to execute various applications such as a browser 575 or a content access application 580 for an electronic retail store and/or other applications. The browser 575 may be executed in a client device 570, for example, to access and render content pages, such as web pages or other network content served up by the computing device 510 and/or other servers. The content access application 580 may be executed to obtain and render content features from servers or computing devices, or other services and/or local storage media for display.

In some implementations, the content access application 580 may correspond to code that is executed in the browser 575 or plug-ins to the browser 575. In other implementations, the content access application 580 may correspond to a standalone application, such as a mobile application. The client device may be configured to execute applications beyond those mentioned above, such as, for example, remote desktop applications, mobile applications, email applications, instant message applications and/or other applications. Customers at client devices 570 may access content features through content display devices or through content access applications 580 executed in the client devices 570.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 6:
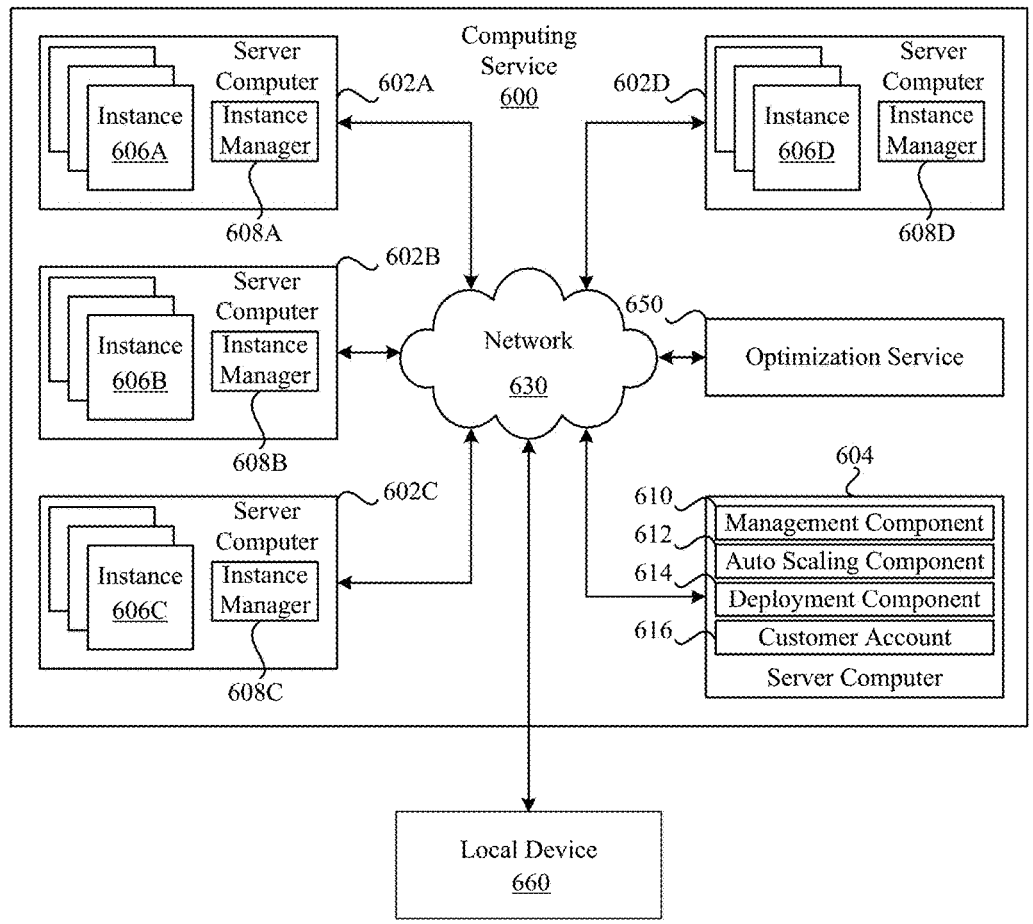
FIG. 6 is a schematic overview of a computing service provider in accordance with an example of the present technology.

FIG. 6 illustrates how networked computing resources or services may function in a computing service 600 or a service provider environment. As discussed earlier, the computing service 600 (i.e., the cloud provider or service provider) may be capable of delivery of computing and storage capacity as a service to a community of end recipients. In an example implementation, the computing service may be established for an organization by or on behalf of the organization. That is, the computing service 600 may offer a "private cloud environment." In another implementation, the computing service 600 may support a multi-tenant environment, wherein a plurality of customers operate independently (i.e., a public cloud environment). Generally speaking, the computing service 600 can provide the following models: Infrastructure as a Service ("IaaS"), Platform as a Service ("PaaS"), and/or Software as a Service ("SaaS"). Other models may also be provided. For the IaaS model, the service provider environment may offer computers as physical or virtual machines and other resources. The PaaS model may deliver a computing platform that can include an operating system, programming language execution environment, database, and web server. Application developers may develop and run software solutions in the service provider environment without the cost of buying and managing the underlying hardware and software. The SaaS model allows installation and operation of application software in the service provider environment. In some implementations, end users access the computing service 600 using networked client devices, such as desktop computers, laptops, tablets, smartphones, etc. running web browsers or other lightweight client applications. Those skilled in the art will recognize that the computing service 600 can be described as a "cloud" environment.

The particularly illustrated computing service 600 may include a plurality of server computers 602A-602D. While four server computers are shown, any number may be used, and large centers may include thousands of server computers. The server computers 602A-602D may provide computing resources for executing computing instances or software instances 606A-606D. In one implementation, the instances 606A-606D may be virtual machines or computing instances. A virtual machine may be an instance of a software implementation of a machine (i.e. a computer) that executes applications like a physical machine. In the example of a virtual machine, each of the servers 602A-602D may be configured to execute an instance manager 608A-608D capable of executing the instances. The instance manager 608A-608D may be a hypervisor or another type of program configured to enable the execution of multiple instances 606A-606D on a single server. Additionally, each of the instances 606 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 604 may be reserved for executing software components for managing the operation of the server computers 602A-D and the instances 606A-D. For example, the server computer 604 may execute a management component 610. A customer may access the management component 610 to configure various aspects of the operation of the instances 606 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 612 may scale the instances 606 based upon rules defined by the customer. In one implementation, the auto scaling component 612 may allow a customer to specify scale-up policies for use in determining when new instances should be instantiated and scale-down policies for use in determining when existing instances should be terminated. The auto scaling component 612 may consist of a number of subcomponents executing on different server computers 602 or other computing devices. The auto scaling component 612 may monitor available computing resources over an internal management network and modify resources available based on predictions of need as well as based on actual need.

A deployment component 614 may be used to assist customers in the deployment of new instances 606 of computing resources. The deployment component 614 may have access to account information associated with the instances, such as who is the owner of the account, credit card information, country of the owner, etc. The deployment component 614 may receive a configuration from a customer that includes data describing how new instances 606 should be configured. For example, the configuration may specify one or more applications to be installed in new instances 606, provide scripts and/or other types of code to be executed for configuring new instances 606, provide cache logic specifying how an application cache should be prepared, and other types of information. The deployment component 614 may utilize the customer-provided configuration and cache logic to configure, prime, and launch new instances 606. The configuration, cache logic, and other information may be specified by a customer using the management component 610 or by providing this information directly to the deployment component 614.

Customer account information 616 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP (Internet Protocol) addresses used to access the account, etc. Information such as the unique identifier, IP addresses used to access the account and so forth may be used in authenticating a user to the service provider environment.

A network 630 may be utilized to interconnect the server computers 602A-602D and the server computer 604. The network 630 may be a local area network (LAN) and may be connected to a Wide Area Network (WAN) so that end users may access the computing service 600. It should be appreciated that the network topology illustrated in FIG. 6 has been simplified and that many more networks and networking devices may be utilized to interconnect the various computing systems disclosed herein.

An optimization service 650 may be a service for optimizing inter service network communications. Specifically, the optimization service 650 may optimize for bandwidth, security, workload and network address translation as has been described. The optimization service 650 may determine what workload needs to be completed and what resources are needed to complete the workload, such as CPU, memory, bandwidth or the like. The optimization service 650 may utilize thresholds defined in the rules described with respect to FIG. 5 to perform the optimizations. For example, if bandwidth availability is low, such as less than a predefined threshold data transfer rate (e.g., kilobits per second, megabits per second, gigabits per second) and spare processing capacity is available, such as a current load using less than 0.7 or 70% of available processing capacity, then the spare processing capacity may be used to compress the data. The optimization service 650 may use the thresholds to determine whether to process data on the private or public service networks, or whether to request adding processing capacity, bandwidth, etc., and so forth in order to fully utilize resources while minimizing cost and maximizing efficiency.

Figure 7:
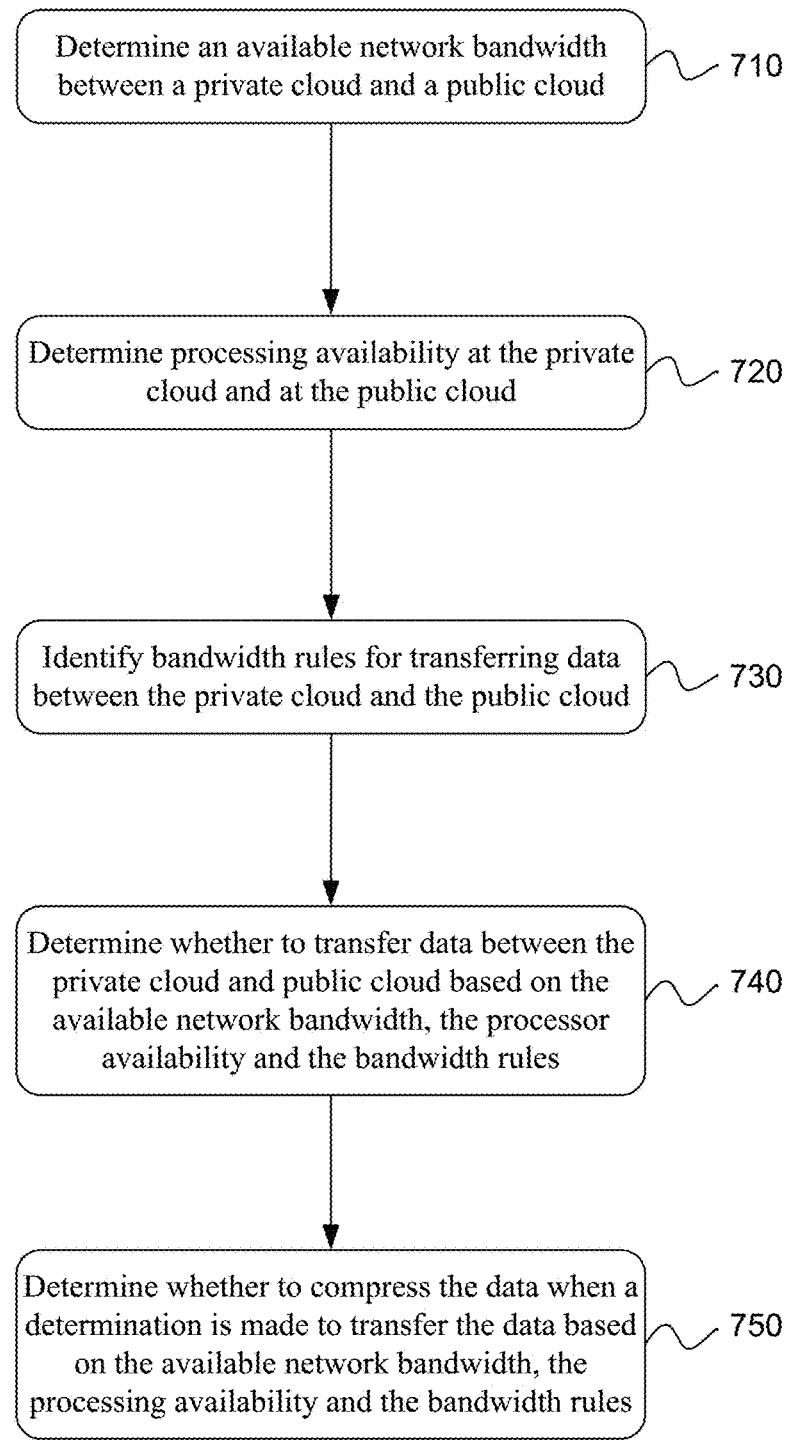
FIGS. 7-8 are flow diagrams for methods of implementing inter service network communication optimization in accordance with examples of the present technology.
Figure 8:
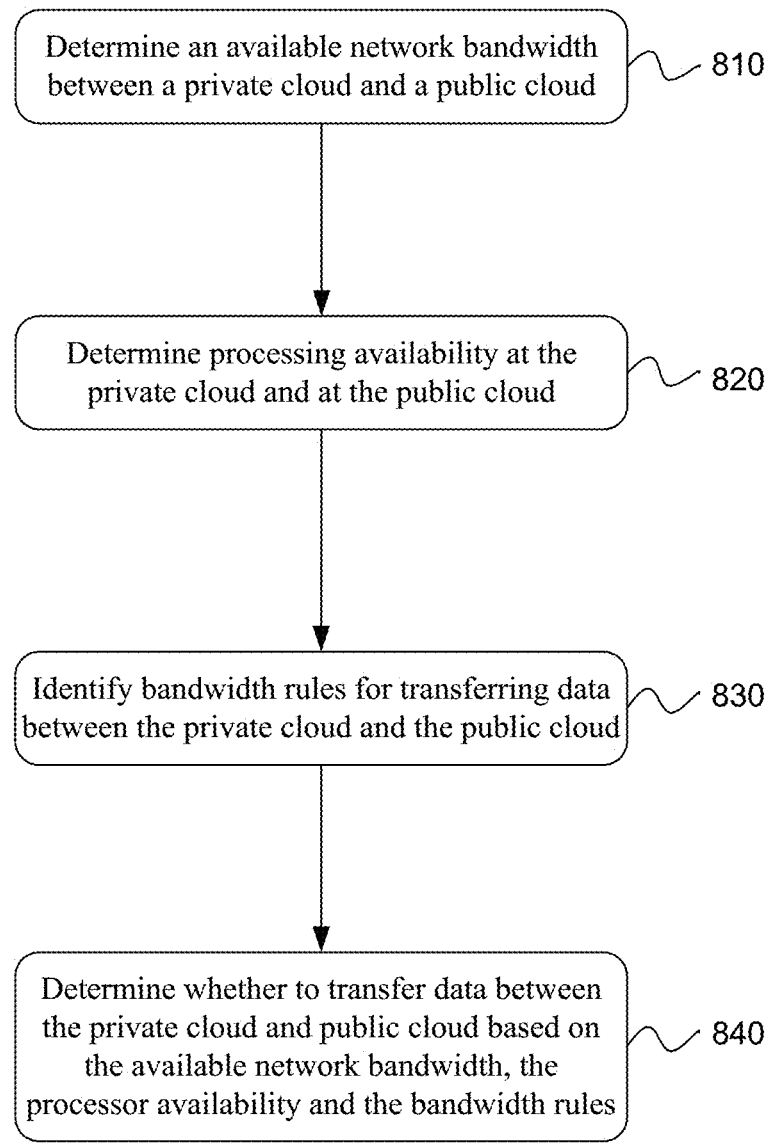

FIGS. 7-8 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 7, a flow diagram of a method is illustrated for inter service network communication optimization in accordance with an example of the present technology. The steps of this and other methods may be performed in any suitable order and is not necessarily limited to the order described or illustrated.

The method may include determining 710 an available network bandwidth between a private service network and a public service network. Processing availability at the private service network and at the public service network may also be determined 720. For example, processing availability may refer to a data migration capacity for migrating or transferring data between the private and public service networks. As another example, processing availability may refer to a post-migration processing capacity for performing jobs based on the transferred data. Bandwidth rules for transferring data between the private service network and the public service network may be identified 730. These rules may be defined by an administrator, for example and stored in a bandwidth rules data store. The method may further include determining 740 when or whether to transfer data between the private service network and public service network based on the available network bandwidth, the processor availability and the rules. If the data is to be transferred, then a subsequent determination 750 may be made for whether to compress the data based on the available network bandwidth, the processing availability and the rules.

The method may include further optimizations, such as performing network address translation. For example, the method may include detecting IP address conflicts between IP addresses of the private service network and the public service network. IP address conflicts may be identified, for example, by maintaining address tables for the public and private service networks and inspecting packets sent between the private service network and the public service network. Conflicts may be detected by identifying an IP address in the private service network or the public service network from which the packets are sent and comparing this source IP address to the address table for the recipient service network (private or public). A network address translation of the IP address in the private service network or the public service network from which the packets are sent may be performed to translate the IP address to a non-conflicting IP address when there is a conflict with the IP address from which the packets are sent.

The method may include optimizing security of the packets sent between the private service network and the public service network by inspecting packets to identify whether a header of the packets indicates a security standard for the packets. Detected security standards (as indicated in the header) may be enforced. The method may also include optimizing a workload for the public service network and the private service network by identifying a priority of jobs to be performed. The priority may be indicated by an indication of QoS for the packet in the header. The QoS priority information may be identified by inspecting the header of the packets to determine whether an indicator of priority is present. Both the public service network and the private service network may be used to perform the jobs based on the priority indicated in the header. In other words, the jobs may be assigned and/or divided between the service networks based on the priority information in the header as has been described previously.

The various optimizations for improving inter service network communications and distribution of jobs may be further improved in combination with machine learning techniques. For example, machine learning may be used to learn when network spikes are likely to occur (such as on a schedule or in response to events), and further to learn how best to prepare for or respond to such network spikes in order to maintain a desired throughput, latency or the like.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 8, a flow diagram of a method is illustrated for inter service network communication optimization in accordance with another example of the present technology. The method may include determining 810 an available network bandwidth between a private service network and a public service network, and determining 820 processing availability at the private service network and at the public service network. Rules for transferring data between the private service network and the public service network may be identified 830. When or whether to transfer data between the private service network and public service network may be determined 840 based on the available network bandwidth, the processor availability and the rules.

The method may further include performing network address translation by detecting internet protocol (IP) address conflicts between IP addresses of the private service network and the public service network, inspecting packets sent between the private service network and the public service network to identify an IP address in the private service network or the public service network from which the packets are sent; and performing a network address translation of the IP address in the private service network or the public service network from which the packets are sent to a non-conflicting IP address when there is a conflict with the IP address from which the packets are sent.

The method may further include optimizing security of the packets sent between the private service network and the public service network. Security optimization may include, for example, inspecting packets to identify whether a header of the packets indicates a security standard for the packets, and enforcing the security standard when the security standard is indicated in the header.

The method may further include optimizing a workload for the public service network and the private service network. Workload optimization may include, for example, identifying a priority of jobs to be performed by inspecting the header of the packets to determine whether an indicator of priority is present. The method may involve using both the public service network and the private service network to perform the jobs based on the priority indicated in the header.

The method may include determining the network bandwidth, the processor availability and the rules for multiple public service networks or multiple private service networks. A single service network may be selected from among the plurality of service networks to which to transfer the data.

The method may include transferring the data between the private service network and the public service network when the available network bandwidth and the processor availability is small. The definition of small may be indicated in the bandwidth rules. For example, the bandwidth rules may specify a threshold network bandwidth and processor availability which may be used for determining whether to send the data, whether to compress the data when sending, and so forth. When both network bandwidth and processor availability are small, the data may simply be sent, without compression, as quickly as the available network bandwidth permits.

The method may include caching static data at the public service network and at the private service network, and determining to not transfer the data when the data is the static data. The method may include evaluating the available network bandwidth when the available network bandwidth is variable against cost of utilizing a larger amount of the available network bandwidth using the bandwidth rules. The method may include notifying a user when processing availability at the private and/or public service network is below a predetermined threshold and prompting the user to request additional processing resources for the private and/or public service network. For example, when private service network processing availability is low, the user may be notified to request processing resources from the public service network. When multiple public service networks are in use and available network bandwidth or the processor availability for a first public service network is below a predetermined threshold, the data or jobs may be sent to a second public service network.

Similarly as mentioned in the description of the method illustrated in FIG. 7, additional example details, operations, options, variations, etc. that may be part of the method illustrated in FIG. 8 have been described previously herein and/or are described in further detail below. Various systems, devices, components, modules and so forth for implementing the method may also be used, as described with respect to the various examples included in this disclosure.

In some examples, this or other methods described herein may be implemented wholly or partially as computer readable program code executed by a processor and the computer readable code may be embodied on a non-transitory computer usable medium.

Figure 9:
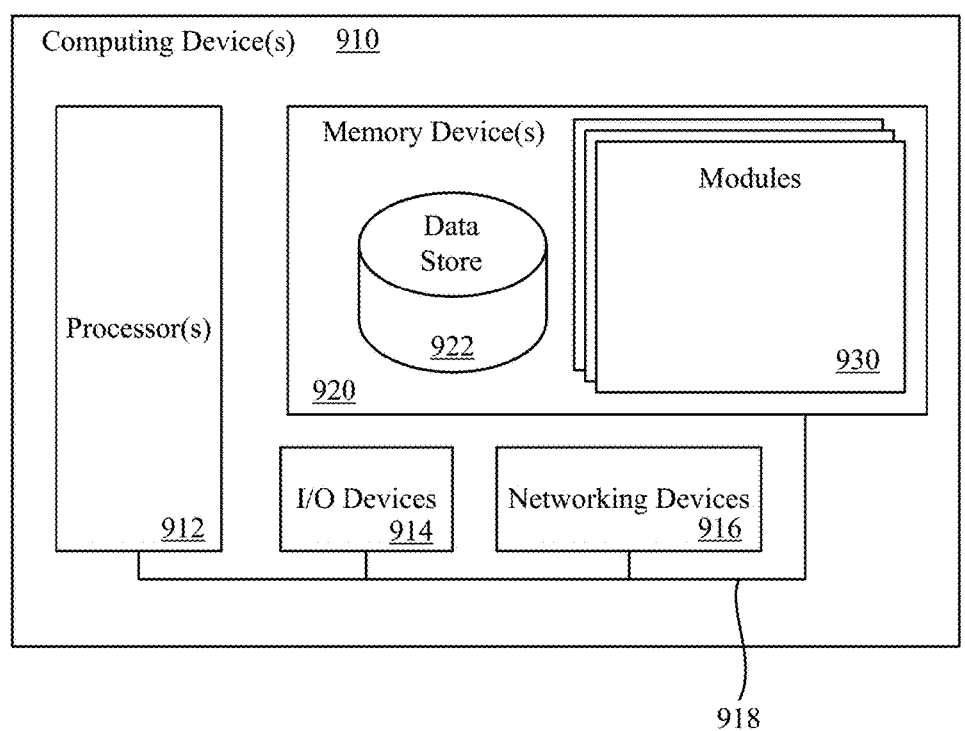
FIG. 9 is a block diagram of a computing system for implementing an inter service network communication optimization system in accordance with an example of the present technology.

FIG. 9 illustrates a computing device 910 on which services or modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 930 that are executable by the processor(s) and data for the modules. A data store 922 may also be located in the memory device 920 for storing data related to the modules and other applications along with an operating system that is executable by the processor(s) 912.

The computing device 910 may further include or be in communication with a client device, which may include a display device. The client device may be available for an administrator to use in interfacing with the computing device 910, such as to review metrics, define alarms, manage resources and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Functional units, services or the like may be implemented as a hardware circuit comprising custom VLSI circuits or gate arrays, off-the-shelf semiconductors such as logic chips, transistors, or other discrete components. Functional units, services or the like may also be implemented in programmable hardware devices such as field programmable gate arrays, programmable array logic, programmable logic devices or the like.

Functional units, services or the like may also be implemented in software for execution by various types of processors. An identified module of executable code may, for instance, comprise one or more blocks of computer instructions, which may be organized as an object, procedure, or function. Nevertheless, the executables need not be physically located together, but may comprise disparate instructions stored in different locations and achieve the stated purpose for the executables when joined logically together.

Executable code may be a single instruction, or many instructions, and may even be distributed over several different code segments, among different programs or applications, and across several memory devices. Similarly, operational data may be embodied in any suitable form and organized within any suitable type of data structure. The operational data may be collected as a single data set, or may be distributed over different locations including over different storage devices.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method for inter service network communication optimization, comprising:
    under control of one or more computer systems configured with executable instructions,
        determining an available network bandwidth between a private service network and a public service network for communications between the private service network and the public service network, wherein the communications are related to processing a workload comprising a plurality of jobs;
        identifying processing availability at the private service network and at the public service network for shared processing of the plurality of jobs at the private service network and the public service network, wherein both the private service network and the public service network process the workload according to the processing availability at the private service network and at the public service network;
        identifying bandwidth rules for transferring data associated with the plurality of jobs between the private service network and the public service network;
        determining whether to transfer the data between the private service network and public service network based in part on the available network bandwidth, the processing availability, and the bandwidth rules; and
        determining whether to compress the data when a determination is made to transfer the data based on the available network bandwidth, the processing availability, and the bandwidth rules.

2. The method of claim 1, further comprising:
    detecting internet protocol (IP) address conflicts between IP addresses of the private service network and the public service network,
    inspecting packets sent between the private service network and the public service network to identify an IP address in the private service network or the public service network from which the packets are sent; and
    performing a network address translation of the IP address in the private service network or the public service network from which the packets are sent to a non-conflicting IP address when there is a conflict with the IP address from which the packets are sent.

3. The method of claim 2, further comprising:
    optimizing security of the packets sent between the private service network and the public service network by inspecting packets to identify whether a header of the packets indicates a security standard for the packets; and
    enforcing the security standard when the security standard is indicated in the header.

4. The method of claim 3, further comprising optimizing a workload for the public service network and the private service network by identifying a priority of the plurality of jobs to be performed by inspecting the header of the packets to determine whether an indicator of priority is present.

5. A computer-implemented method, comprising:
    determining an available network bandwidth between a private service network and a public service network for communications between the private service network and the public service network, wherein the communications are related to processing a workload comprising a plurality of jobs;

determining processing availability at the private service network and at the public service network for shared processing of the plurality of jobs at the private service network and the public service network, wherein both the private service network and the public service network process the workload according to the processing availability at the private service network and at the public service network;

identifying bandwidth rules for transferring data associated with the plurality of jobs between the private service network and the public service network; and determining whether to compress the data to be transferred between the private service network and public service network based in part on the available network bandwidth, the processing availability, and the bandwidth rules.

6. The method of claim 5, further comprising:

detecting internet protocol (IP) address conflicts between IP addresses of the private service network and the public service network, inspecting packets sent between the private service network and the public service network to identify an IP address in the private service network or the public service network from which the packets are sent; and performing a network address translation of the IP address in the private service network or the public service network from which the packets are sent to a non-conflicting IP address when there is a conflict with the IP address from which the packets are sent.

7. The method of claim 5, further comprising optimizing security of packets sent between the private service network and the public service network by inspecting packets to identify whether a header of the packets indicates a security standard for the packets, and enforcing the security standard when the security standard is indicated in the header.

8. The method of claim 7, further comprising enforcing the security standard by encrypting the packets or preventing the packets from being sent.

9. The method of claim 5, further comprising optimizing a workload for the public service network and the private service network by identifying a priority of jobs to be performed by inspecting a header of packets to determine whether an indicator of priority is present.

10. The method of claim 5, wherein the public service network or the private service network comprises a plurality of service networks, the method further comprising determining the network bandwidth, the processing availability and the bandwidth rules for the plurality of service networks and selecting a single service network from among the plurality of service networks to which to transfer the data.

11. The method of claim 5, further comprising transferring the data between the private service network and the public service network when the available network bandwidth and the processing availability is small when indicated by the bandwidth rules.

12. The method of claim 5, further comprising caching static data at the public service network and at the private service network, and determining to not transfer the data when the data is the static data.

13. The method of claim 5, further evaluating the available network bandwidth when the available network bandwidth is variable against a cost of utilizing a larger amount of the available network bandwidth based on the bandwidth rules.

14. The method of claim 5, further comprising notifying a user when processing availability of the private service network is below a predetermined threshold and prompting the user to request additional processing resources from the public service network.

15. The method of claim 5, wherein the public service network is a first public service network and the method further comprises routing the data to a second public service network when the available network bandwidth or the processing availability for the first public service network is below a predetermined threshold.

16. A system, comprising:

at least one processor;

a memory device including instructions that, when executed by the at least one processor, cause the system to:

determine: an available network bandwidth between a private service network and a public service network, a processor availability at the private service network and at the public service network and when to transfer data between the private service network and public service network based on the available network bandwidth, the processor availability and bandwidth rules for transferring data between the private service network and the public service network, and whether to compress the data when a determination is made to transfer the data based on the available network bandwidth, the processor availability, and the bandwidth rules;

detect internet protocol (IP) address conflicts between IP addresses of the private service network and the public service network;

inspect packets sent between the private service network and the public service network to identify an IP address in the private service network or the public service network from which the packets are sent;

perform a network address translation of the IP address in the private service network or the public service network from which the packets are sent to a non-conflicting IP address when there is a conflict with a source of the IP address;

optimize security of the packets sent between the private service network and the public service network by inspecting packets to identify whether a header of the packets indicates a security standard for the packets and enforcing the security standard when the security standard is indicated in the header; and optimize a workload for the public service network and the private service network by identifying a priority of jobs to be performed by inspecting the header of the packets to determine whether an indicator of priority is present and using both the public service network and the private service network to perform the jobs based on the priority indicated in the header.

17. The system of claim 16, wherein the memory device includes instructions that, when executed by the processor, cause the system to assign the security standard based on the indicator of priority for packets.

18. The system of claim 16, wherein the memory device includes instructions that, when executed by the processor, cause the system to determine a compute cost of the jobs, the memory and network bandwidth to complete the jobs, and whether to compress the data in packets, when transferring the data from the private service network to the public service network.

19. The system of claim 16, wherein the memory device includes instructions that, when executed by the processor, cause the system to determine how to split the jobs between the public service network and the private service network based on a type of content contained in packets as indicated in the header.

20. The system of claim 16, wherein the memory device includes instructions that, when executed by the processor, cause the system to implement a first network address translation service on the public service network and a second network address translation service on the private service network and to synchronize network address translation tables between the first and second services.

* * * * *